US012585985B2

(12) United States Patent (10) Patent No.: US 12,585,985 B2
Takahashi et al. (45) Date of Patent: Mar. 24, 2026

(54) RECOGNITION SYSTEM, MODEL PROCESSING APPARATUS, MODEL PROCESSING METHOD, AND RECORDING MEDIUM FOR INTEGRATING MODELS IN RECOGNITION PROCESSING

(71) Applicant: NEC Corporation, Tokyo (JP)

(72) Inventors: Katsuhiko Takahashi, Tokyo (JP); Tetsuo Inoshita, Tokyo (JP); Asuka Ishii, Tokyo (JP); Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1056 days.

(21) Appl. No.: 17/633,402

(22) PCT Filed: Aug. 21, 2019

(86) PCT No.: PCT/JP2019/032612
§ 371 (c)(1),
(2) Date: Feb. 7, 2022

(87) PCT Pub. No.: WO2021/033288
PCT Pub. Date: Feb. 25, 2021

(65) Prior Publication Data
US 2022/0292397 A1 Sep. 15, 2022

(51) Int. Cl.
*G06N 20/00* (2019.01)
(52) U.S. Cl.
CPC .................................... *G06N 20/00* (2019.01)
(58) Field of Classification Search
None
See application file for complete search history.

(56) References Cited

U.S. PATENT DOCUMENTS

2015/0106308 A1* 4/2015 Harrison ................ G06N 5/043
706/12
2016/0217387 A1 7/2016 Okanohara et al.
2017/0090980 A1* 3/2017 Martin .................. G06F 9/5066
(Continued)

FOREIGN PATENT DOCUMENTS

JP 2010-282556 A 12/2010
JP 2018-510399 A 4/2018
(Continued)

OTHER PUBLICATIONS

Dean, J et al., "Large scale distributed deep networks," Advances in Neural Information Processing Systems (NIPS 2012) 11 pp. (Year: 2012).*

(Continued)

*Primary Examiner* — Brian M Smith
(74) *Attorney, Agent, or Firm* — Sughrue Mion, PLLC

(57) ABSTRACT

The server device receives a model information from a plurality of terminal devices, and generates an integrated model by integrating the model information received from the plurality of terminal devices. The server device generates an updated model by learning a model defined by the model information received from the terminal device of update-target using the integrated model. Then, the server device transmits the model information of the updated model to the terminal device. Thereafter, the terminal device executes recognition processing using updated model.

12 Claims, 12 Drawing Sheets

(56)          References Cited

U.S. PATENT DOCUMENTS

| 2018/0018590 | A1* | 1/2018 | Szeto | .................... G16H 10/60 |
| 2019/0095760 | A1 | 3/2019 | Kudo | |
| 2020/0349473 | A1 | 11/2020 | Idesawa et al. | |

FOREIGN PATENT DOCUMENTS

| JP | 2019-061578 | A | 4/2019 |
| WO | 2019/131527 | A1 | 7/2019 |

OTHER PUBLICATIONS

Jeong, E. et al., "Communication-efficient on-device machine learning: federated distillation and augmentation under non-iid private data," downloaded from <arxiv.org/abs/1811.11479v1> (Nov. 28, 2018) 6 pp. (Year: 2018).*

JP Office Action for JP Application No. 2021-541407, mailed on Jan. 24, 2023 with English Translation.

International Search Report for PCT Application No. PCT/JP2019/032612, mailed on Oct. 29, 2019.

* cited by examiner

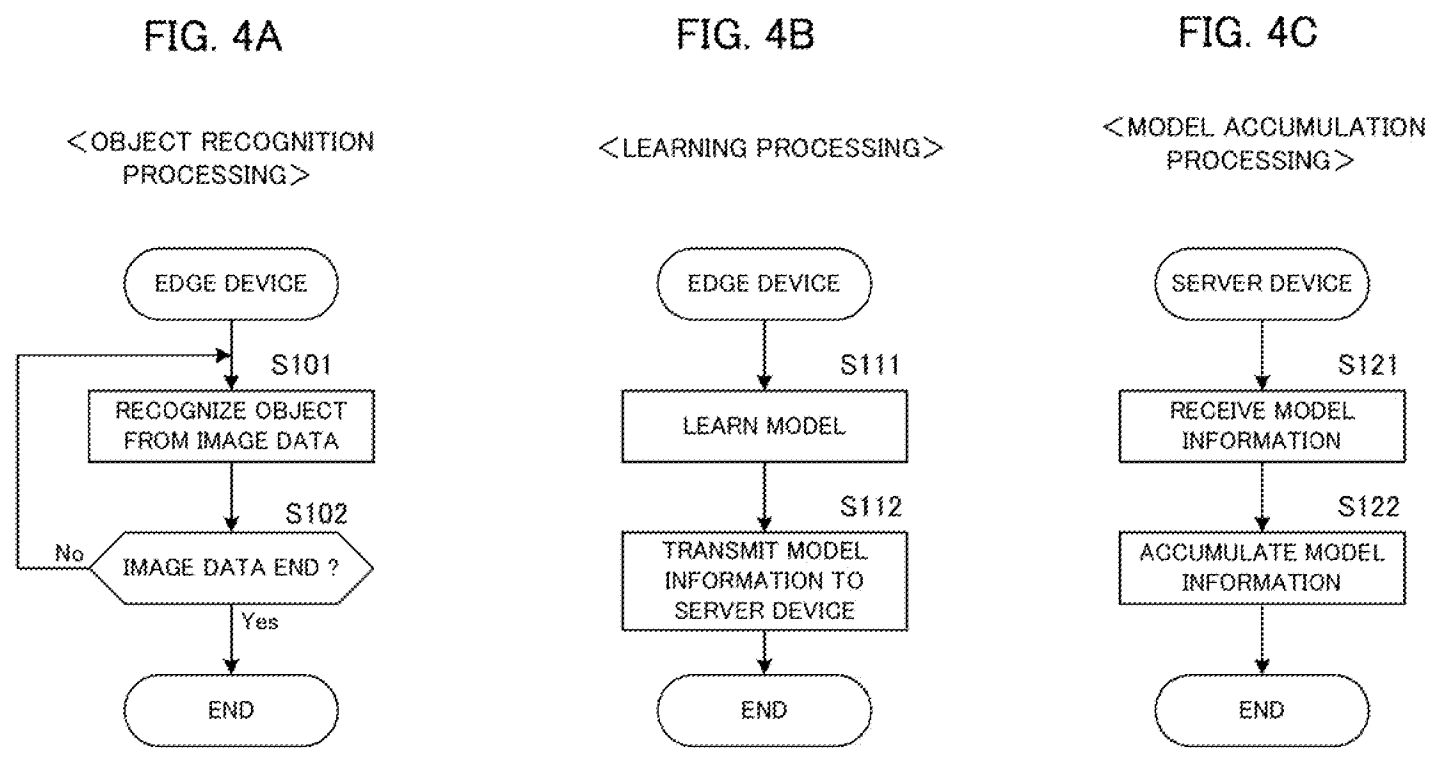

\<MODEL ACCUMULATION PROCESSING\>

SERVER DEVICE

S121 RECEIVE MODEL INFORMATION

S122 ACCUMULATE MODEL INFORMATION

END

FIG. 4B

\<LEARNING PROCESSING\>

EDGE DEVICE

S111 LEARN MODEL

S112 TRANSMIT MODEL INFORMATION TO SERVER DEVICE

END

FIG. 4A

\<OBJECT RECOGNITION PROCESSING\>

EDGE DEVICE

S101 RECOGNIZE OBJECT FROM IMAGE DATA

S102 IMAGE DATA END ?

No

Yes

END

<MODEL UPDATE PROCESSING>

Figure 6:
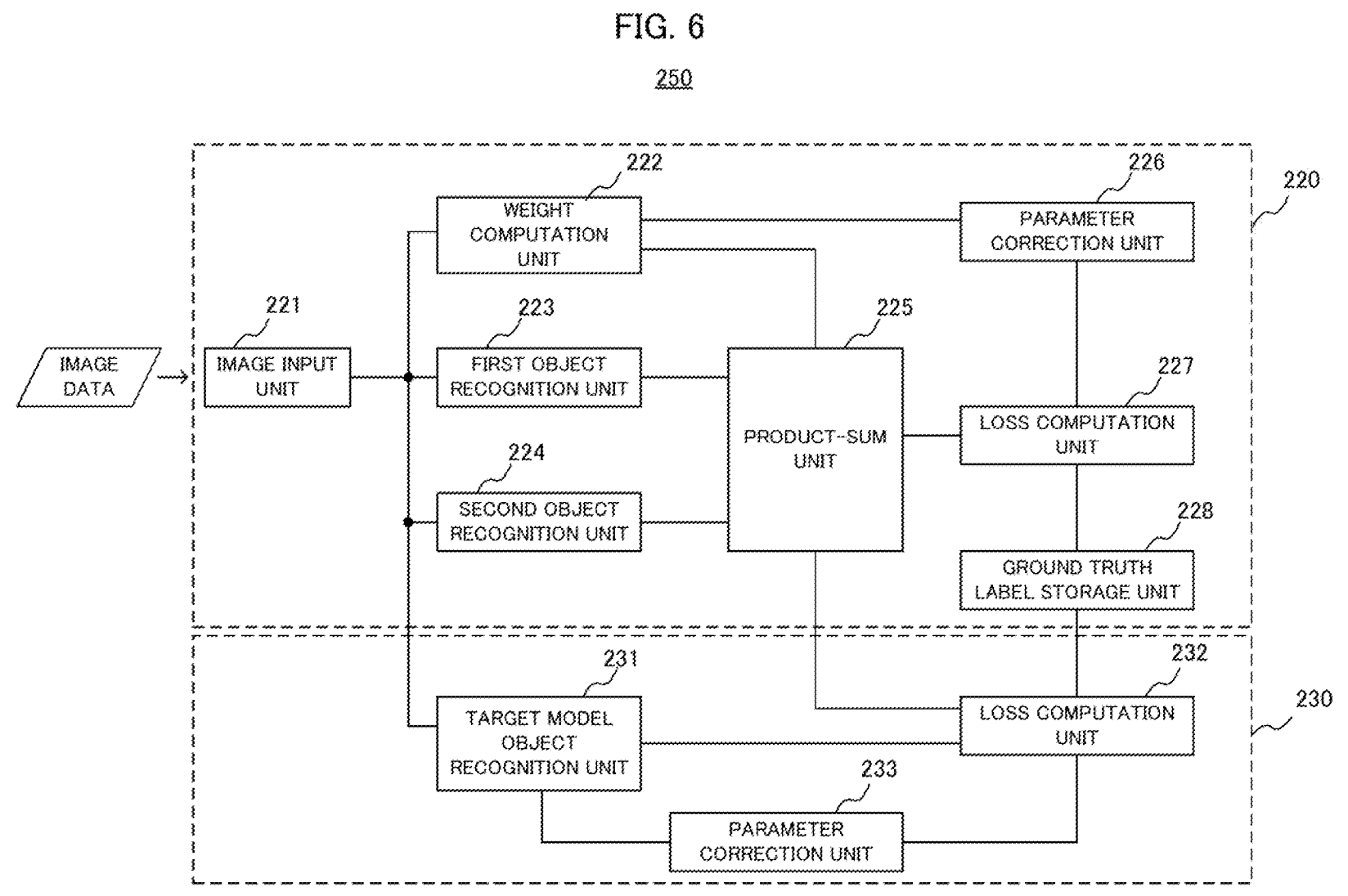

226 — PARAMETER CORRECTION UNIT

227 — LOSS COMPUTATION UNIT

228 — GROUND TRUTH LABEL STORAGE UNIT

232 — LOSS COMPUTATION UNIT

225 — PRODUCT-SUM UNIT

233 — PARAMETER CORRECTION UNIT

222 — WEIGHT COMPUTATION UNIT

223 — FIRST OBJECT RECOGNITION UNIT

224 — SECOND OBJECT RECOGNITION UNIT

231 — TARGET MODEL OBJECT RECOGNITION UNIT

221 — IMAGE INPUT UNIT

IMAGE DATA

Figure 11:
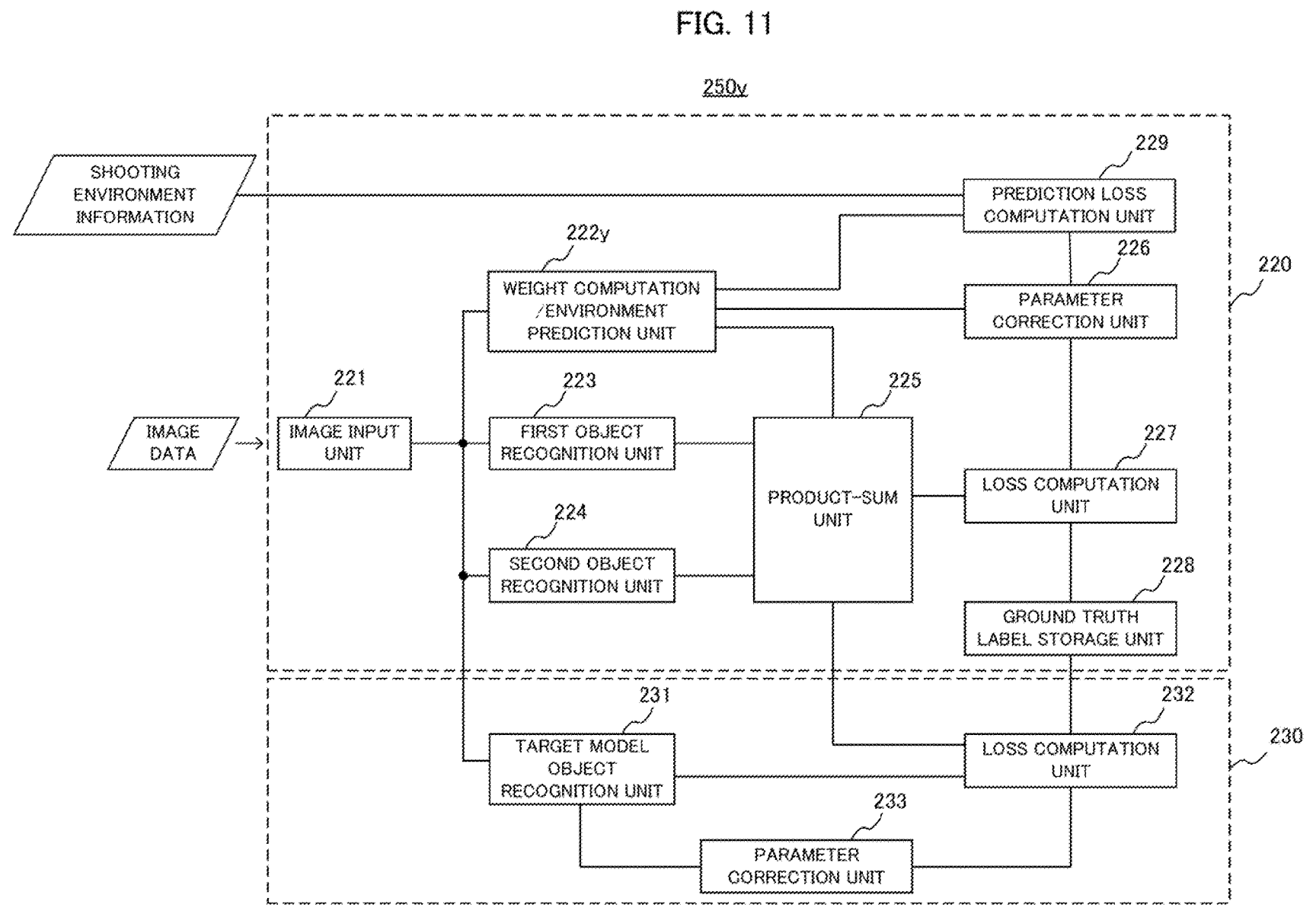

SHOOTING ENVIRONMENT INFORMATION

IMAGE DATA

221 IMAGE INPUT UNIT

222v WEIGHT COMPUTATION / ENVIRONMENT PREDICTION UNIT

223 FIRST OBJECT RECOGNITION UNIT

224 SECOND OBJECT RECOGNITION UNIT

225 PRODUCT-SUM UNIT

229 PREDICTION LOSS COMPUTATION UNIT

226 PARAMETER CORRECTION UNIT

227 LOSS COMPUTATION UNIT

228 GROUND TRUTH LABEL STORAGE UNIT

231 TARGET MODEL OBJECT RECOGNITION UNIT

232 LOSS COMPUTATION UNIT

233 PARAMETER CORRECTION UNIT

RECOGNITION SYSTEM, MODEL PROCESSING APPARATUS, MODEL PROCESSING METHOD, AND RECORDING MEDIUM FOR INTEGRATING MODELS IN RECOGNITION PROCESSING

This application is a National Stage Entry of PCT/JP2019/032612 filed on Aug. 21, 2019, the contents of all of which are incorporated herein by reference, in their entirety.

TECHNICAL FIELD

The present invention relates to a technique for recognizing an object contained in an image.

BACKGROUND ART

It is known that the performance of the recognizer can be improved by performing learning using many pattern data. It is also performed to tune a recognizer from a base recognizer to a recognizer adapted to each environment. Also, various methods have been proposed to improve recognition accuracy according to different environments. For example, Patent Reference 1 discloses a learning support device for improving the determination performance using a learned discriminator learned in a plurality of terminal devices. Specifically, the learning support device collects the parameters of the neural network forming the learned discriminator learned in the plurality of terminals, and distributes the learned discriminator having the highest accuracy rate to each terminal device as a new learning discriminator.

PRECEDING TECHNICAL REFERENCES

Patent Document

Patent Reference 1: Japanese Patent Application Laid-Open under No. 2019-61578

SUMMARY

Problem to be Solved by the Invention

In the technique of Patent Reference 1, the learning support device selects the learned discriminator having the highest accuracy rate among the learned discriminators in the plurality of terminal devices, and distributes it to each terminal device. Therefore, it is not possible to effectively utilize the characteristics of the learned discriminators that have not been selected.

It is one object of the present invention to provide a recognition system capable of optimally integrating multiple models learned in various field environments to generate a model with high accuracy.

Means for Solving the Problem

In order to solve the above problem, according to one aspect of the present invention, there is provided a recognition system comprising a plurality of terminal devices and a server device, wherein the terminal device includes:

a terminal-side transmission unit configured to transmit a model information defining a model used in a recognition processing to the server device; and a terminal-side reception unit configured to receive the model information defining an updated model generated by the server device, and wherein the server device includes:

a server-side reception unit configured to receive the model information from the plurality of terminal devices;

a model integration unit configured to generate an integrated model by integrating the model information received from the plurality of terminal devices;

a model update unit configured to generate the updated model by learning a model defined by the model information received from the terminal device of update-target using the integrated model; and a server-side transmission unit configured to transmit the model information of the updated model to the terminal device of update-target.

According to another aspect of the present invention, there is provided a model processing device capable of communicating with a plurality of terminal devices, comprising:

a reception unit configured to receive a model information from a plurality of terminal devices;

a model integration unit configured to generate an integrated model by integrating the model information received from the plurality of terminal devices;

a model update unit configured to generate an updated model by learning a model defined by the model information received from the terminal device of update-target using the integrated model; and a transmission unit configured to transmit the model information of the updated model to the terminal device of update-target.

According to still another aspect of the present invention, there is provided a model processing method comprising:

receiving a model information from a plurality of terminal devices;

generating an integrated model by integrating the model information received from the plurality of terminal devices;

generating an updated model by learning a model defined by the model information received from the terminal device of update-target using the integrated model; and transmitting the model information of the updated model to the terminal device of update-target.

According to still another aspect of the present invention, there is provided a recording medium storing a program that causes a computer to execute a processing of:

receiving a model information from a plurality of terminal devices;

generating an integrated model by integrating the model information received from the plurality of terminal devices;

generating an updated model by learning a model defined by the model information received from the terminal device of update-target using the integrated model; and transmitting the model information of the updated model to the terminal device of update-target.

Effect of the Invention

According to the present invention, it is possible to provide a recognition system capable of generating a model with high accuracy by optimally integrating multiple models learned in various field environments.

BRIEF DESCRIPTION OF THE DRAWINGS

FIG. 3 is a block diagram showing a functional configuration of the object recognition system.

FIGS. 4A to 4C are flowcharts of an object recognition processing, a learning processing, and a model accumulation processing.

FIG. 6 is a block diagram showing a functional configuration of a first example of a model update unit.

FIG. 9 is a block diagram showing a functional configuration of a second example of the model update unit.

FIG. 11 is a block diagram showing a functional configuration of a third example of the model update unit.

EXAMPLE EMBODIMENTS

Preferred example embodiments of the present invention will be hereinafter described with reference to the accompanied drawings.

First Example Embodiment

Overall Configuration

Figure 1:
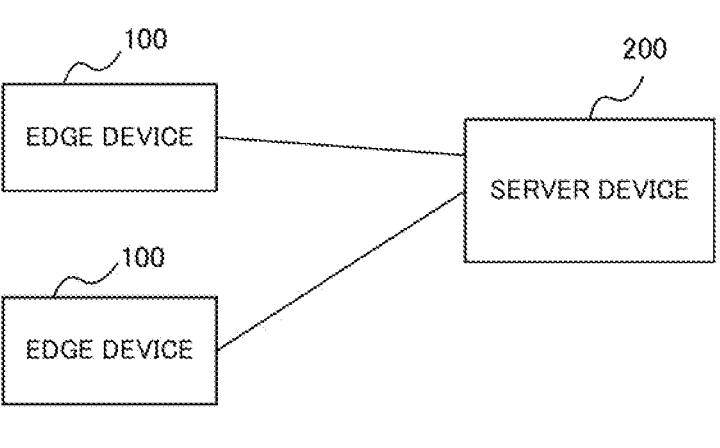
FIG. 1 is a block diagram showing a configuration of an object recognition system according to a first example embodiment.

FIG. 1 is a block diagram illustrating a configuration of an object recognition system according to a first example embodiment. The object recognition system 1 is used in a video monitoring system, for example, and includes a plurality of edge devices 100 and a server device 200 as illustrated. The plurality of edge devices 100 and the server device 200 are configured to be able to communicate with each other. The edge device 100 is a terminal device that is installed at a location for performing object recognition, and performs object recognition from image data captured by a camera or the like. Usually, each of the plurality of edge devices 100 is installed at a different location and performs object recognition for image data taken at that location (hereinafter also referred to as "site"). Specifically, the edge device 100 learns a model (hereinafter also referred to as "edge model") for object recognition included therein based on image data for learning. Then, using the model obtained by learning (hereinafter referred to as "learned edge model"), object recognition is performed from the image data actually taken at the site. The edge device 100 also transmits model information defining the learned edge model therein to the server device 200. Incidentally, the edge device 100 is an example of a terminal device of the present invention.

The server device 200 receives the model information of the edge model from the plurality of edge devices 100, and integrates them to generate a large-scale model for object recognition. Also, the server device 200 learns the edge model of the individual edge devices 100 using the generated large-scale model, and generates a new edge model. Thus, generating a new edge model using a large-scale model of the server device 200 is referred to as "updating the edge model", and the generated new edge model is referred to as "the updated edge model". The server device 200 transmits the model information of the updated edge model to the individual edge device 100.

Hardware Configuration

Edge Device

Figure 2A:
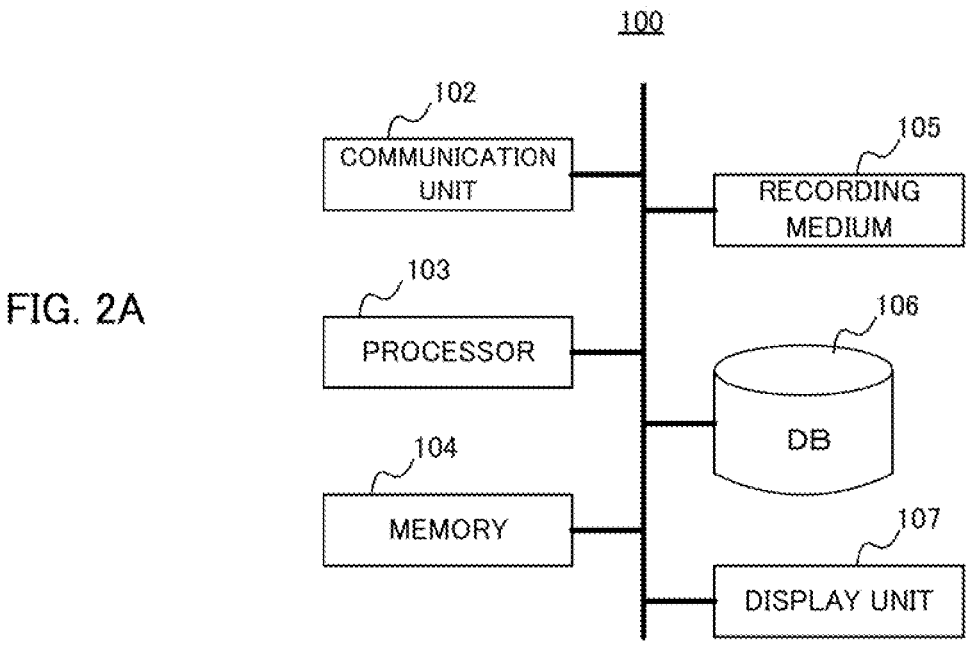
FIGS. 2A and 2B are block diagrams showing a hardware configuration of an edge device and a server device.

FIG. 2A is a block diagram showing a hardware configuration of the edge device 100. As shown, the edge device 100 includes a communication unit 102, a processor 103, a memory 104, a recording medium 105, a database (DB) 106, and a display unit 107.

The communication unit 102 communicates with the server device 200 through a wired or wireless network. Specifically, the communication unit 102 transmits the image data acquired at the site where the edge device 100 is installed and the model information representing the learned edge model learned inside the edge device 100 to the server device 200. Also, the communication unit 102 receives the model information representing the updated edge model generated in the server device 200 from the server device 200.

The processor 103 is a computer such as a CPU (Central Processing Unit) or a CPU and a GPU (Graphics Processing Unit), and controls the entire edge device 100 by executing a program prepared in advance. Specifically, the processor 103 executes an object recognition processing, a learning processing, and a model update processing to be described later.

The memory 104 may be a ROM (Read Only Memory), a RAM (Random Access Memory), or the like. The memory 104 stores the model information representing the model for object recognition used by edge device 100. The memory 104 stores various programs to be executed by the processor 103. The memory 104 is also used as a work memory during the execution of various processes by the processor 103.

The recording medium 105 is a non-volatile, non-transitory recording medium such as a disk-shaped recording medium, a semiconductor memory, or the like, and is configured to be detachable from the edge device 100. The recording medium 105 records various programs executed by the processor 103. When the edge device 100 performs various processing, a program recorded on the recording medium 105 is loaded into the memory 104 and executed by the processor 103.

The database 106 stores image data for learning, which is used in the learning processing of the edge device 100. The image data for learning includes ground truth labels. The database 106 also stores image data acquired at the site, i.e., image data to be subject to actual object recognition processing. The display unit 107 is, for example, a liquid crystal display device, and displays the result of the object recognition processing. In addition to the above, the edge device 100 may include an input device such as a keyboard, a mouse, or the like for the user to perform instructions and input.

Server Device

Figure 2B:
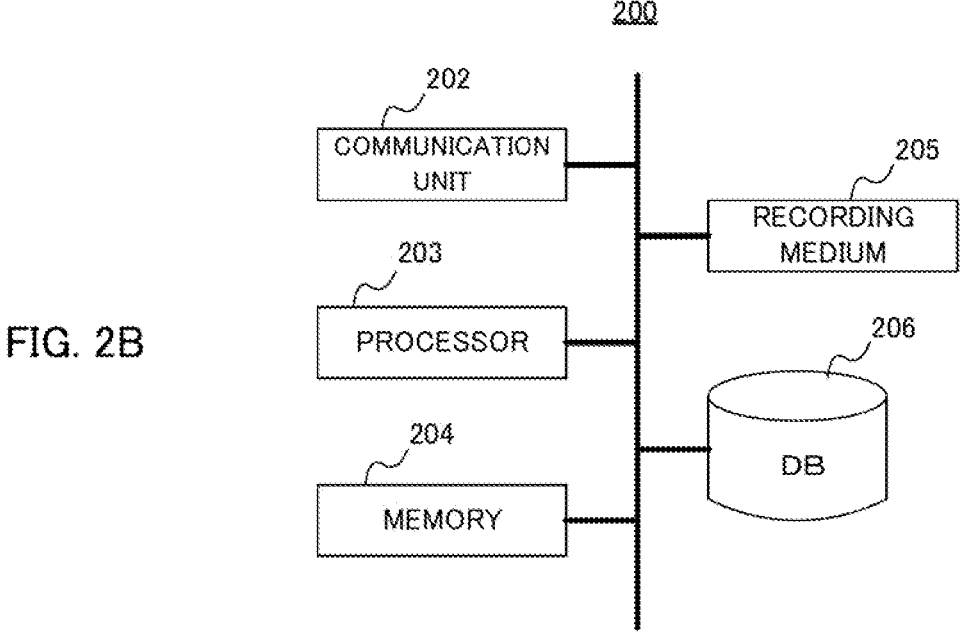

FIG. 2B is a block diagram showing a hardware configuration of the server device 200. As shown, the server device 200 includes a communication unit 202, a processor 203, a memory 204, a recording medium 205, and a database (DB) 206.

The communication unit 202 communicates with the plurality of edge devices 100 through a wired or wireless network. Specifically, the communication unit 202 receives, from the edge device 100, the image data acquired at the site where the edge device 100 is installed and the model information representing the learned edge model learned inside the edge device 100. Further, the communication unit 202 transmits model information representing the updated edge model generated by the server device 200 to the edge device 100.

The processor 203 is a computer such as a CPU or a CPU with a GPU, and controls the entire server device 200 by executing a program prepared in advance. Specifically, the processor 203 executes the model accumulation processing and the model update processing described later.

The memory 204 may be a ROM, a RAM, and the like. The memory 204 stores model information representing the edge models transmitted from a plurality of edge devices 100. The memory 204 stores various programs to be executed by the processor 203. The memory 204 is also used as a work memory during the execution of various processes by the processor 203.

The recording medium 205 is a non-volatile, non-transitory recording medium such as a disk-shaped recording medium, a semiconductor memory, or the like, and is configured to be detachable from the server device 200. The recording medium 205 records various programs executed by the processor 203. When the server device 200 executes various kinds of processing, a program recorded on the recording medium 205 is loaded into the memory 204 and executed by the processor 203.

The database 206 stores image data for learning, which is used in the model update processing. The image data for learning includes ground truth labels. The database 206 also stores image data acquired at the site of each edge device 100 used in the model update processing of the edge model. In addition to the above, the server device 200 may include a keyboard, an input device such as a mouse, or a display device.

Functional Configuration

Figure 3:
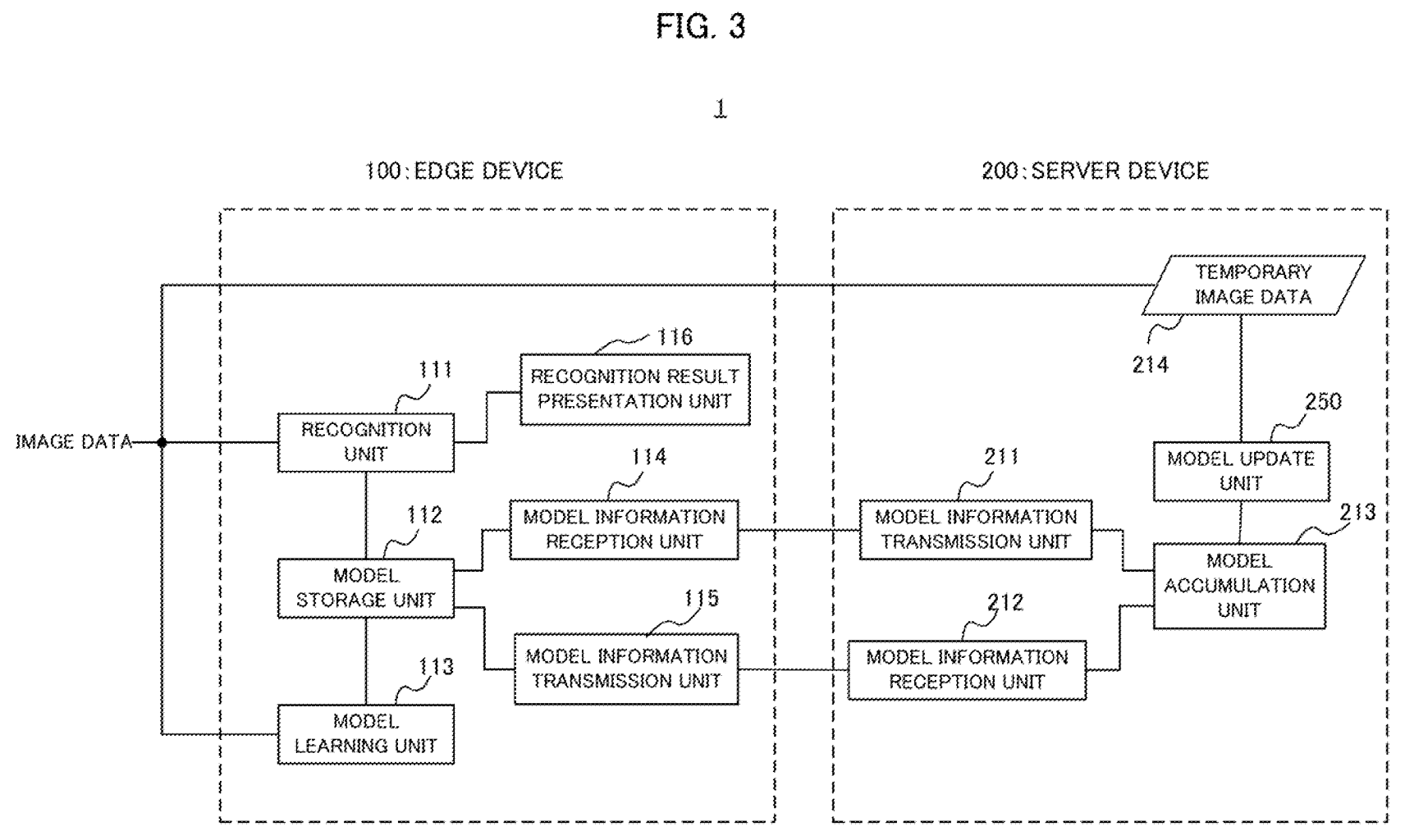

Next, a functional configuration of the object recognition system 1 will be described. FIG. 3 is a block diagram showing the functional configuration of the object recognition system 1. The edge device 100 includes a recognition unit 111, a model storage unit 112, a model learning unit 113, a model information reception unit 114, a model information transmission unit 115, and a recognition result presentation unit 116. The server device 200 includes a model information transmission unit 211, a model information reception unit 212, a model accumulation unit 213, and a model update unit 250.

In the edge device 100, an edge model for performing object recognition from image data is stored in the model storage unit 112. At the beginning of the operation of the edge device 100, the learned edge model that has performed the learning of the required level is stored in the model storage unit 112. Thereafter, the model learning unit 113 periodically performs the learning of the edge model using the image data obtained at the site. The recognition unit 111 performs object recognition from the image data obtained at the site where the edge device 100 is installed using the edge model stored in the model storage unit 112, and outputs the recognition result. The recognition result is displayed on the display unit 107 or the like shown in FIG. 2A by the recognition result presentation unit 116.

The model information transmission unit 115 transmits model information of the edge model stored in the model storage unit 112 to the server device 200 in order to update the edge model. Here, "model information" includes the structure of the model (hereinafter referred to as "a model structure") and a set of parameters set in the model (hereinafter referred to as "a parameter set"). For example, in case of a model for object recognition using a neural network, the model structure is the structure of the neural network, and the parameter set is a set of parameters set to the coupling part of each layer in the neural network. The model information reception unit 114 receives the model information of the updated edge model generated by the server device 200 from the server device 200, and stores the model information in the model storage unit 112. Incidentally, the model information reception unit 114 is an example of the terminal-side reception unit of the present invention, and the model information transmission unit 115 is an example of the terminal-side transmission unit of the present invention.

In the server device 200, the model information reception unit 212 receives the model information of the edge model from the plurality of edge devices 100 and stores them in the model accumulation unit 213. Thus, the edge model being learned and used in the plurality of edge devices 100 are accumulated in the model accumulation unit 213. The model update unit 250 integrates a plurality of edge models accumulated in the model accumulation unit 213 to generate a large-scale model. The large-scale model is an example of an integrated model of the present invention.

Further, the server device 200 receives, from the edge device 100, a portion of the image data obtained at the site where the edge device 100 is installed as the temporary image data 214. Then, the model update unit 250 updates the edge model using the large-scale model and the temporary image data 214, and accumulates the updated edge model in the model accumulation unit 213. The model information transmission unit 211 transmits the model information representing the updated edge model to the edge device 100, which is the transmission source of the edge model. It is noted that the model information transmission unit 211 is an example of the server-side transmission unit of the present invention, the model information reception unit 212 is an example of the server-side reception unit of the present invention, and the model update unit 250 is an example of the model integration unit and the model update unit of the present invention.

Operation

Next, the operation of the object recognition system 1 will be described. The edge device 100 performs an object recognition processing, a learning processing, and a model update processing. The server device 200 performs a model storage processing and a model update processing.

First, an object recognition processing in the edge device 100 will be described. The object recognition processing is a processing in which the edge device 100 recognizes an object from the image data, and basically is always executed in the edge device 100. FIG. 4A is a flowchart of the object recognition processing. When the image data obtained at the site is inputted, the recognition unit 111 recognizes the object from the image data using the edge model stored in the model storage unit 112, and outputs the recognition result (step S101). Then, the recognition unit 111 determines whether or not the objective image data has ended. When the image data has not ended (step S102: No), the recognition unit 111 recognizes the object from the next image data (step S101). On the other hand, when the image data has ended (step S102: Yes), the object recognition processing ends.

Next, a learning processing in the edge device 100 will be described. The learning processing is a processing of learning an edge model in the edge device 100. The learning processing may be performed, for example, at a predetermined date and time, or periodically at a predetermined time interval, or when a user designates. FIG. 4B is a flowchart of the learning processing. The model learning unit 113 learns the edge model stored in the model storage unit 112 using the image data obtained at the site (step S111). When the learning is completed, the model information transmission unit 115 stores the model information of the learned edge model in the model storage unit 112 and transmits the model information to the server device 200 (step S112). Then, the learning processing ends.

Next, a model accumulation processing in the server device 200 will be described. The model accumulation processing is a processing of accumulating the edge models transmitted from the edge devices 100 in the server device 200. FIG. 4C is a flowchart of the model accumulation processing. As described above, the edge device 100 transmits the model information of the learned edge model to the server device 200 when the learning processing therein is completed. In the server device 200, the model information reception unit 212 receives the model information of the learned edge model (step S121), and accumulates the model information in the model accumulation unit 213 (step S122). Then, the model accumulation processing ends. Thus, every time the learning processing is executed in each edge device 100, the model information of the learned edge model is accumulated in the server device 200.

Figure 5:
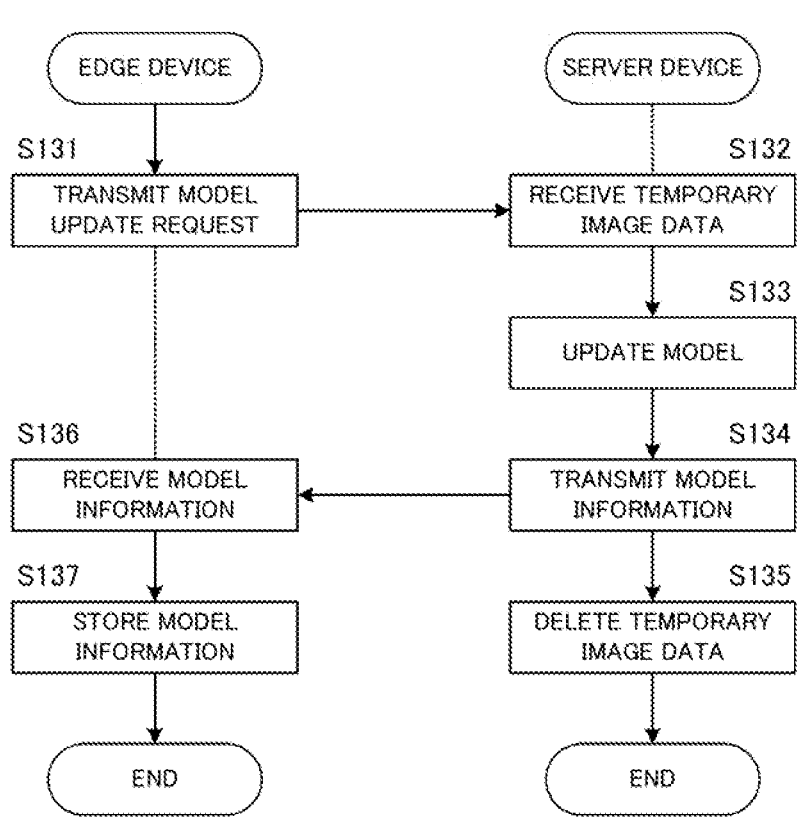
FIG. 5 is a flowchart of a model update processing.

Next, a model update processing will be described. The model update processing is performed by the edge device 100 and the server device 200 in cooperation. FIG. 5 is a flowchart of the model update processing. Now, as an example, it is assumed that the edge device 100 starts the model update processing. The edge device 100 starts the model update processing, for example, when the edge model is learned by the learning processing, or when a predetermined amount of new image data is obtained at the site. When starting the model update processing, the edge device 100 transmits a model update request to the server device 200 (step S131). At this time, the edge device 100 transmits a predetermined amount of image data obtained at the site to the server device 200 as the temporary image data 214.

The server device 200 receives the temporary image data 214 from the edge device 100 (step S132). Next, the model update unit 250 updates the edge model of the edge device 100 that has transmitted the model update request, using the large-scale model generated using the plurality of edge models and the temporary image data 214 (step S133). Specifically, the model update unit 250 acquires the latest edge model of the target edge device 100 from the model accumulation unit 213, updates the edge model, and stores the updated edge model in the model accumulation unit 213. Then, the model information transmission unit 211 transmits the model information of the updated edge model to the edge device 100 (step S134). Further, the server device 200 deletes the temporary image data 214 received from the edge device 100 in step S132 (step S135).

In the edge device 100, the model information reception unit 114 receives the model information of the updated edge model from the server device 200 (step S136), and stores it in the model storage unit 112 (step S137). Then, the model update processing ends. Thereafter, the edge device 100 basically executes the recognition processing using the edge model updated by the server device 200.

Thus, according to the model update processing, since the server device 200 updates the edge model using the large-scale model generated using the plurality of edge models, the characteristics of the plurality of edge models can be integrated to update the edge model. Further, since the server device 200 updates the edge model using the temporary image data obtained at the site of the objective edge device 100, it is possible to generate the updated edge model suitable for the site of the objective edge device 100. Since the temporary image data is only a portion of the image data obtained at the site and is deleted when the update of the edge model is completed, the handling of confidential image data does not cause any problem.

In the above example, the edge device 100 starts the model update processing by transmitting the model update request. Instead, the server device 200 may start the model update processing. For example, the server device 200 may start the model update processing when a learned edge model is transmitted from the edge device 100. In that case, the server device 200 may request the edge device 100 to transmit the temporary image data.

Application Example

For the above example embodiment, the following applications may be applied.

Application Example 1

In the above-described example embodiment, when the model update processing is executed, the edge device 100 replaces the edge model before executing the model update processing (hereinafter referred to as the "pre-update edge model") with the updated edge model received from the server device 200, and uses it for the subsequent object recognition processing. Alternatively, the edge device 100 may once hold both the pre-update edge model and the updated edge model, and select one of them for use in subsequent object recognition processing. In this case, for example, the recognition result presenting unit 116 of the edge device 100 may present the recognition result by the pre-update edge model and the updated edge model to the user, and use the model selected by the user for the subsequent object processing. In that case, the edge device 100 may display the recognition result by the two edge models, for example, as the recognition results for specific comparative test image data, specifically, as an image showing the frame indicating the recognized object and the reliability of the recognition on the comparative test image data. Instead, the edge device 100 may display a list indicating the type and number of objects recognized for the comparative test image data. Further, when the ground truth data for comparison test image data is prepared, the edge device 100 may display a numerical value indicating the recognition accuracy by each edge model. Still further, when the recognition result of the two edge models can be computed based on the ground truth data in this way, instead of allowing the user to select the recognition result, the edge device 100 may automatically select the model having the better performance based on the computed recognition result.

Application Example 2

In the above example embodiment, it is necessary to unify the class code used in the models for object recognition between the edge device 100 and the server device 200. Therefore, when the class code system is different between the edge models used in the plurality of edge devices 100, the server device 200 generates the large-scale model after unifying the class code system, and executes the model update processing.

Now, it is assumed that there are "person", "automobile" and "traffic signal" as classes of recognition objects. It is assumed that the class code system of one edge device X is "person=1", "automobile=2", and "traffic signal=3", and that the class code system of another edge device Y is "person=A", "automobile=B", and "traffic signal=C". In this case, the server device 200 cannot integrate the edge models of the two edge devices X and Y as they are. Therefore, when each of the edge devices X and Y transmits the model information of the learned edge model to the server device 200, each of the edge devices X and Y also includes information indicating its class code system in the model information and transmit the model information to the server device 200. By this, the server device 200 can unify the class codes of the recognition objects indicated by each edge model based on the received information indicating the class code system. Once the edge device 100 transmits the information indicating the class code system to the server device 200, the edge device 100 does not need to transmit the class code system each time it transmits the model information related to the edge model, unless the class code system is changed.

Incidentally, the above-described method is to unify the class code system on the server device 200 side when the class code system of each edge device 100 is different. Instead, the class code system used by server device 200 may be determined as a standard class code system, and all the edge devices 100 may use this standard class code system. In this case, when transmitting the model information of the edge model to the server device 200, each edge device 100 converts the class code system used internally to the standard class code system, and then transmits the model information to the server device 200.

Examples of Model Update Unit

Next, examples of the model update unit 250 in the server device 200 will be described in detail.

First Example

FIG. 6 is a block diagram illustrating a functional configuration of the model update unit 250. The model update unit 250 first executes a step of learning a large-scale model including a plurality of object recognition units (hereinafter referred to as "large-scale model learning step"), and then executes a step of learning a target model corresponding to the updated edge model using the learned large-scale model (hereinafter referred to as "target model learning step"). The object recognition unit is a unit that recognizes an object using the edge model used in the edge device 100.

As illustrated, the model update unit 250 roughly includes a large-scale model unit 220 and a target model unit 230. The large-scale model unit 220 includes an image input unit 221, a weight computation unit 222, a first object recognition unit 223, a second object recognition unit 224, a product-sum unit 225, a parameter correction unit 226, a loss computation unit 227, and a ground truth label storage unit 228. The target model unit 30 includes a target model object recognition unit 231, a loss computation unit 232, and a parameter correction unit 233.

Here, the "target model" refers to an edge model (hereinafter referred to as the "update-target edge model") of the edge device 100 that is the target of the model update (hereinafter referred to as the "update-target edge device"). Further, the first object recognition unit 223 and the second object recognition unit 224 recognize the object by the edge model learned by the edge device 100 different from the update-target edge device 100, respectively. Therefore, the first object recognition unit 223 and the second object recognition unit 224 use the learned edge model learned in each edge device 100 in advance and do not execute the learning in the processing described below. In the above configuration, the image input unit 221 is realized by the communication unit 202 shown in FIG. 2B, the ground truth label storage unit 228 is realized by the database 206 shown in FIG. 2B, and the other components are realized by the processor 203 shown in FIG. 2B.

Image data for learning is inputted to the image input unit 221. Here, as the image data for learning, the temporary image data 214 captured at the site where the update-target edge device 100 is installed is used. For the image data for learning, ground truth labels indicating the objects included in the image are prepared in advance.

The first object recognition unit 223 has a configuration similar to a neural network for object detection by deep learning such as, for example, SSDs (Single Shot Multibox Detector), RetinaNet, Faster-RCNN (Regional Convolutional Neural Network. However, the first object recognition unit 223 outputs the score information and the coordinate information of the recognition target object computed for each anchor box before the NMS (Non-Maximum Suppression) processing as they are. Here, all the partial regions, for which the presence or absence of the recognition target object is verified, are called "anchor boxes".

Figure 7:
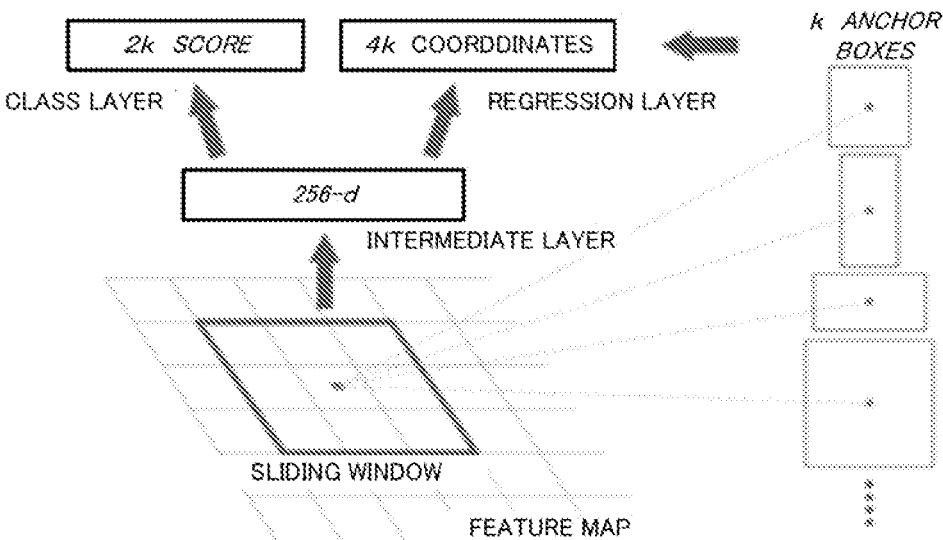
FIG. 7 is a diagram for explaining a concept of an anchor box.

FIG. 7 is a diagram for explaining the concept of anchor boxes. As illustrated, a sliding window is set on a feature map obtained by the convolution of a CNN (Convolutional Neural Network). In the example of FIG. 7, k anchor boxes (hereinafter simply referred to as "anchors") of different size are set with respect to a single sliding window, and each anchor is inspected for the presence or absence of a recognition target object. In other words, the anchors are k partial regions set with respect to all sliding windows.

The second object recognition unit 224 is similar to the first object recognition unit 223, and the structure of the model is also the same. However, since the first object recognition unit 223 and the second object recognition unit 224 use the edge model learned in the different edge device 100, the parameters of the network possessed therein are different, and the recognition characteristics are also different.

The weight computation unit 222 optimizes the parameters for computing the weights (hereinafter referred to as "weight computation parameters") inside. The weight computation unit 222 is configured by a deep neural network or the like that is applicable to regression problems, such as ResNet (Residual Network). The weight computation unit 222 determines weights for merging the score information and coordinate information outputted by the first object recognition unit 223 and the second object recognition unit 224 based on the image data inputted into the image input unit 221, and outputs information indicating each of the weights to the product-sum unit 225. Basically, the number of dimensions of the weights is equal to the number of the object recognition units used. In this case, the weight computation unit 222 preferably computes weights such that the sum of the weight for the first object recognition unit 223 and the weight for the second object recognition unit 224 is "1". For example, the weight computation unit 222 may set the weight for the first object recognition unit 223 to "α", and set the weight for the second object recognition unit 224 to "1-α". With this arrangement, an averaging processing in the product-sum unit 225 can be simplified.

The product-sum unit 225 computes the product-sums of the score information and the coordinate information outputted by the first object recognition unit 223 and the second object recognition unit 224 for respectively corresponding anchors on the basis of the weights outputted by the weight computation unit 222, and then computes an average value. Note that the product-sum operation on the coordinate information is only performed on anchors for which the existence of a recognition target object is indicated by the ground truth label, and computation is unnecessary for all other anchors. The average value is computed for each anchor and each recognition target object.

The ground truth label storage unit 228 stores ground truth labels with respect to the image data for learning. Specifically, the ground truth label storage unit 228 stores class information and coordinate information about a recognition target object existing at each anchor in an array for each anchor as the ground truth labels. The ground truth label storage unit 228 stores class information indicating that a recognition target object does not exist and coordinate information in the storage areas corresponding to anchors where a recognition target object does not exist. Note that in many cases, the original ground truth information with respect to the image data for learning is text information indicating the type and rectangular region of a recognition target object appearing in an input image, but the ground truth labels stored in the ground truth label storage unit 228 are data obtained by converting such ground truth information into class information and coordinate information for each anchor.

For example, for an anchor that overlaps by a predetermined threshold or more with the rectangular region in which a certain object appears, the ground truth label storage unit 228 stores a value of 1.0 indicating the score of the object as the class information at the location of the ground truth label expressing the score of the object, and stores relative quantities of the position (an x-coordinate offset from the left edge, a y-coordinate offset from the top edge, a width offset, and a height offset) of the rectangular region in which the object appears with respect to a standard rectangular position of the anchor as the coordinate information. In addition, the ground truth label storage unit 228 stores a value indicating that an object does not exist at the location of the ground truth label expressing the scores for other objects. Also, for an anchor that does not overlap by a predetermined threshold or more with the rectangular region in which a certain object appears, the ground truth label storage unit 228 stores a value indicating that an object does not exist at the location of the ground truth label where the score and coordinate information of the object are stored.

The loss computation unit 227 checks the score information and coordinate information outputted by the product-sum unit 225 with the ground truth labels stored in the ground truth label storage unit 228 to compute a loss value. Specifically, the loss computation unit 227 computes an identification loss related to the score information and a regression loss related to the coordinate information. The average value outputted by the product-sum unit 225 is defined in the same way as the score information and coordinate information that the first object recognition unit 223 outputs for each anchor and each recognition target object. Consequently, the loss computation unit 227 can compute the value of the identification loss by a method that is exactly the same as the method of computing the identification loss with respect to the output of the first object recognition unit 223. The loss computation unit 227 computes the cumulative differences of the score information with respect to all anchors as the identification loss. Also, for the regression loss, the loss computation unit 227 computes the cumulative differences of the coordinate information only with respect to anchors where an object exists, and does not consider the difference of the coordinate information with respect to anchors where no object exists.

Note that deep neural network learning using identification loss and regression loss is described in the following document, which is incorporated herein as a reference.

"Learning Efficient Object Detection Models with Knowledge Distillation", NeurIPS 2017

In the following, the loss computed by the loss computation unit 227 will be referred to as "large-scale model loss".

The parameter correction unit 226 corrects the parameters of the network in the weight computation unit 222 so as to reduce the loss computed by the loss computation unit 227. At this time, the parameter correction unit 226 fixes the parameters of the networks in the first object recognition unit 223 and the second object recognition unit 224, and only corrects the parameters of the weight computation unit 222. The parameter correction unit 226 can compute parameter correction quantities by ordinary error backpropagation.

The weight computation unit 222 predicts what each object recognition unit is good or poor at with respect to the input image to optimize the weights. The product-sum unit 225 multiplies the weights and the output from each object recognition unit, and averages the results. Consequently, a final determination can be made with high accuracy compared to a standalone object recognition unit. For example, in the case where the first object recognition unit 223 is good at detecting a pedestrian walking alone and the second object recognition unit 224 is good at detecting pedestrians walking in a group, if a person walking alone happens to appear in an input image, the weight computation unit 222 assigns a larger weight to the first object recognition unit 223. Additionally, the parameter correction unit 226 corrects the parameters of the weight computation unit 222 such that the weight computation unit 222 computes a large weight for the object recognition unit that is good at recognizing the image data for learning. By learning the parameters in the weight computation unit 222 in this manner, it becomes possible to construct a large-scale model capable of computing the product-sum of the outputs from the first object recognition unit 223 and the second object recognition unit 224 to perform overall determination.

The target model object recognition unit 231 is an object recognition unit of the edge model to be updated. The target model object recognition unit 231 has a configuration similar to the neural network for object detection, which is the same configuration as the first object recognition unit 223 and the second object recognition unit 224. The target model object recognition unit 231 outputs the score information and the coordinate information of the recognition target object to the loss computation unit 232 based on the image data for learning inputted to the image input unit 221.

The loss computation unit 232 checks the score information and the coordinate information outputted by the target model object recognition unit 231 with the ground truth label stored in the ground truth label storage unit 228, similarly to the loss computation unit 227, and computes the identification loss and the regression loss. Further, the loss computation unit 232 checks the score information and the coordinate information outputted by the target model object recognition unit 231 with the score information and the coordinate information outputted by the product-sum unit 225 to computes the identification loss and the regression loss. The score information and the coordinate information outputted by the product-sum unit 225 correspond to the score information and the coordinate information by the large-scale model. Then, the loss computation unit 232 supplies the computed loss to the parameter correction unit 233.

Incidentally, the image data for learning may include image data that does not have a ground truth label (referred to as "unlabeled image data"). For the unlabeled image data, the loss computation unit 232 may check the score information and the coordinate information outputted by the target model object recognition unit 231 only with the score information and the coordinate information outputted by the product-sum unit 225 to generate the identification loss and the regression loss and output to them to the parameter correction unit 233. Hereinafter, the loss computed by the loss computation unit 232 is also referred to as "target model loss".

The parameter correction unit 233 corrects the parameters of the network in the target model object recognition unit 231 so as to reduce the loss computed by the loss computation unit 232. The parameter correction unit 233 may determine the correction amount of the parameters by the normal error backpropagation method.

Figure 8:
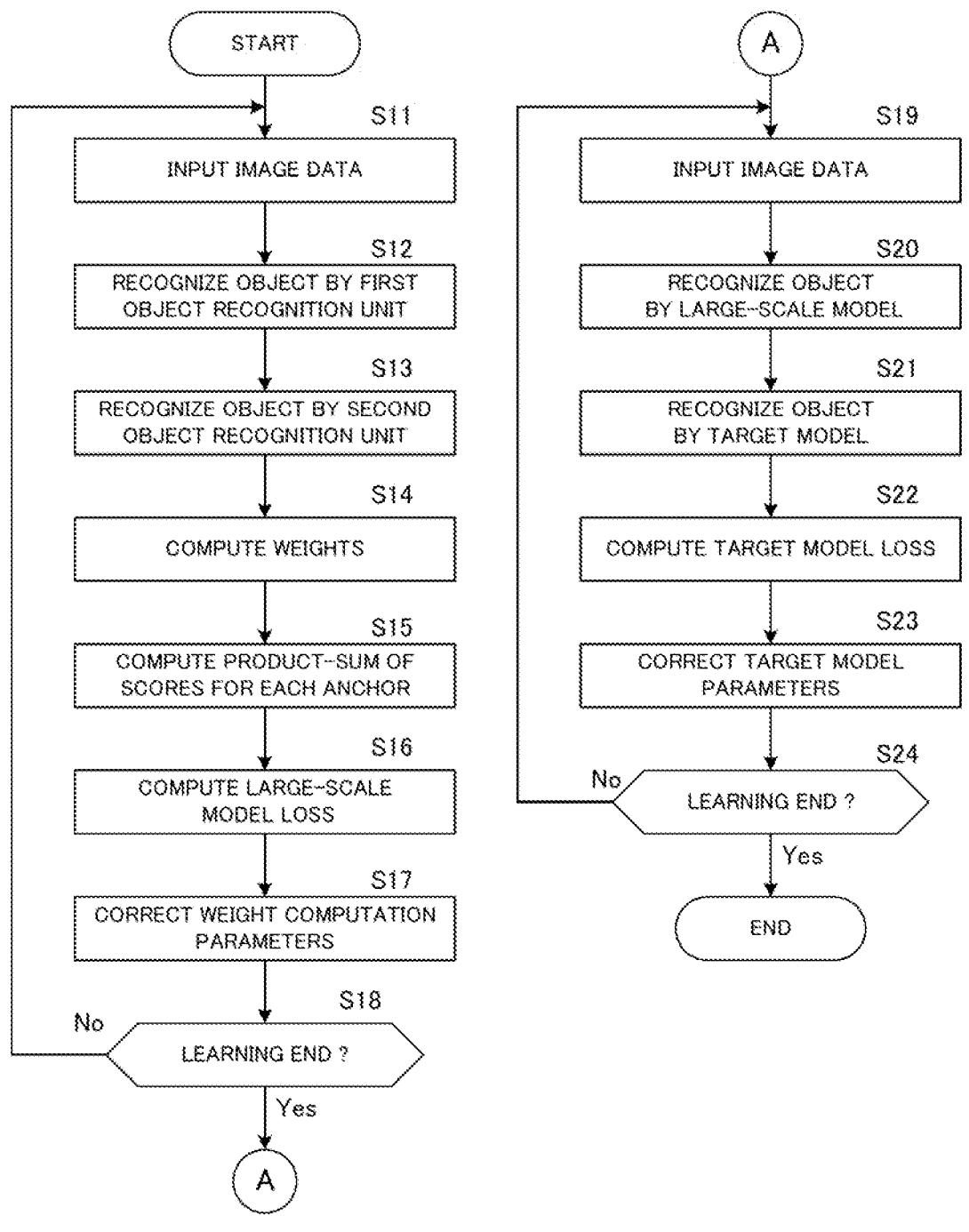
FIG. 8 is a flowchart of a model update processing according to a first example of the model update unit.

Next, operations by the model update unit 250 will be described. FIG. 8 is a flowchart of a model update processing by the model update unit 250. This processing is achieved by causing the processor 203 illustrated in FIG. 2B to execute a program prepared in advance. In FIG. 8, steps S11 to S18 correspond to the large-scale model learning step, and steps S19 to S24 correspond to the target mode learning step. Incidentally, during the execution of the large-scale mode learning step, the target model object recognition unit 231, the loss computation unit 232 and the parameter correction unit 233 do not operate.

First, image data for learning is inputted into the image input unit 221 (step S11). The first object recognition unit 223 performs object recognition using the image data, and outputs score information and coordinate information about recognition target objects in the images for each anchor and each recognition target object (step S12). Similarly, the second object recognition unit 224 performs object recognition using the image data, and outputs score information and coordinate information about recognition target objects in the images for each anchor and each recognition target object (step S13). Also, the weight computation unit 222 receives the image data and computes weights with respect to each of the outputs from the first object recognition unit 223 and the second object recognition unit 224 (step S14).

Next, the product-sum unit 225 multiplies the score information and the coordinate information about the recognition target objects outputted by the first object recognition unit 223 and the score information and the coordinate information about the recognition target objects outputted by the second object recognition unit 224 by the respective weights computed by the weight computation unit 222 for each anchor, and adds the results of the multiplications to output the average value (step S15). Next, the loss computation unit 227 checks the difference between the obtained average value and the ground truth labels, and computes the large-scale model loss (step S16). Thereafter, the parameter correction unit 226 corrects the weight computation parameters in the weight computation unit 222 to reduce the value of the large-scale model loss (step S17).

The model update unit 250 repeats the above steps S11 to S17 while a predetermined condition holds true, and then ends the process. Note that the "predetermined condition" is a condition related to the number of repetitions, the degree of change in the value of the loss, or the like, and any method widely adopted as a learning procedure for deep learning can be used.

When the large-scale model learning step is completed (Step S18: Yes), then the target model learning step is executed. In the target model learning step, the internal parameters of the weight computation unit 222 are fixed to the values learned in the large-scale model learning step. Incidentally, the internal parameters of the first object recognition unit 223 and the second object recognition unit 224 are also fixed to the previously learned values.

When the image data for learning is inputted to the image input unit 221 (Step S19), the large-scale model unit 20 performs object recognition using the inputted image data, and outputs the score information and the coordinate information of the recognition target object in the image to the loss computation unit 232 for each anchor and for each recognition target object (Step S20). Further, the target model object recognition unit 231 performs object recognition using the inputted image data, and outputs the score information and the coordinate information of the recognition target object in the image to the loss computation unit 232 for each anchor and each recognition target object (step S21). Next, the loss computation unit 232 compares the score information and the coordinate information outputted by the target model object recognition unit 231 with the ground truth label stored in the ground truth label storage unit 228 and the score information and the coordinate information outputted by the large-scale model unit 20 to compute the target model loss (step S22). Then, the parameter correction unit 233 corrects the parameters in the target model object recognition unit 231 so as to reduce the value of the target model loss (step S23). The model update unit 250 repeats the above-described steps S19 to S24 while a predetermined condition condition holds true, and then ends the processing.

As described above, according to the first example of the model update unit 250, first, learning of the large-scale model is performed using a plurality of learned object recognition units, and then learning of the update-target edge model is performed using the large-scale model. Therefore, it becomes possible to construct a small-scale and high-accuracy edge model suitable for the environment of the new site where the update-target edge device 100 is located.

Modifications

The following modifications can be applied to the first example of the above model update unit 250.

(1) In the first example described above, learning is performed using score information and coordinate information outputted by each object recognition unit. However, learning may also be performed using only score information, without using coordinate information.

(2) In the first example described above, the two object recognition units of the first object recognition unit 223 and the second object recognition unit 224 are used. However, using three or more object recognition units poses no problem in principle. In this case, it is sufficient if the dimensionality (number) of weights outputted by the weight computation unit 222 is equal to the number of object recognition units.

(3) Any deep learning method for object recognition may be used as the specific algorithms forming the first object recognition unit 223 and the second object recognition unit 224. Moreover, the weight computation unit 222 is not limited to deep learning for regression problems, and any function that can be learned by error backpropagation may be used. In other words, any error function that is partially differentiable by the parameters of a function that computes weights may be used.

(4) Also, in the first example described above, while the object recognition units having the same model structure are used as the first object recognition unit 223 and the second object recognition unit 224, different models may also be used. In such a case, it is necessary to devise associations in the product-sum unit 225 between the anchors of both models corresponding to substantially the same positions. This is because the anchors of different models do not match exactly. As a practical implementation, each anchor set in the second object recognition unit 224 may be associated with one of the anchors set in the first object recognition unit 223, a weighted average may be computed for each anchor set in the first object recognition unit 223, and score information and coordinate information may be outputted for each anchor and each recognition target object set in the first object recognition unit 223. The anchor associations may be determined by calculating image regions corresponding to anchors (rectangular regions where an object exists) and associating the anchors for which image regions appropriately overlap each other.

(5) While the weight computation unit 222 according to the first example sets a single weight for the image as a whole with respect to the output of each object recognition unit, the weight computation unit 222 may compute a weight for each anchor with respect to the output of each object recognition unit, that is, for each partial region of the image.

(6) If the weight computation unit 222 has different binary classifiers for each class like in RetinaNet for example, the weights may be changed for each class rather than for each anchor. In this case, the weight computation unit 222 may compute the weight for each class, and the parameter correction unit 226 may correct the parameters for each class.

Second Example

Next, a second example of the model update unit 250 will be described. In the first example, a large-scale model is learned first, and then the large-scale model is used to learn the target model. In contrast, in the second example, learning of the large-scale model and learning of the target model are performed simultaneously.

Figure 9:
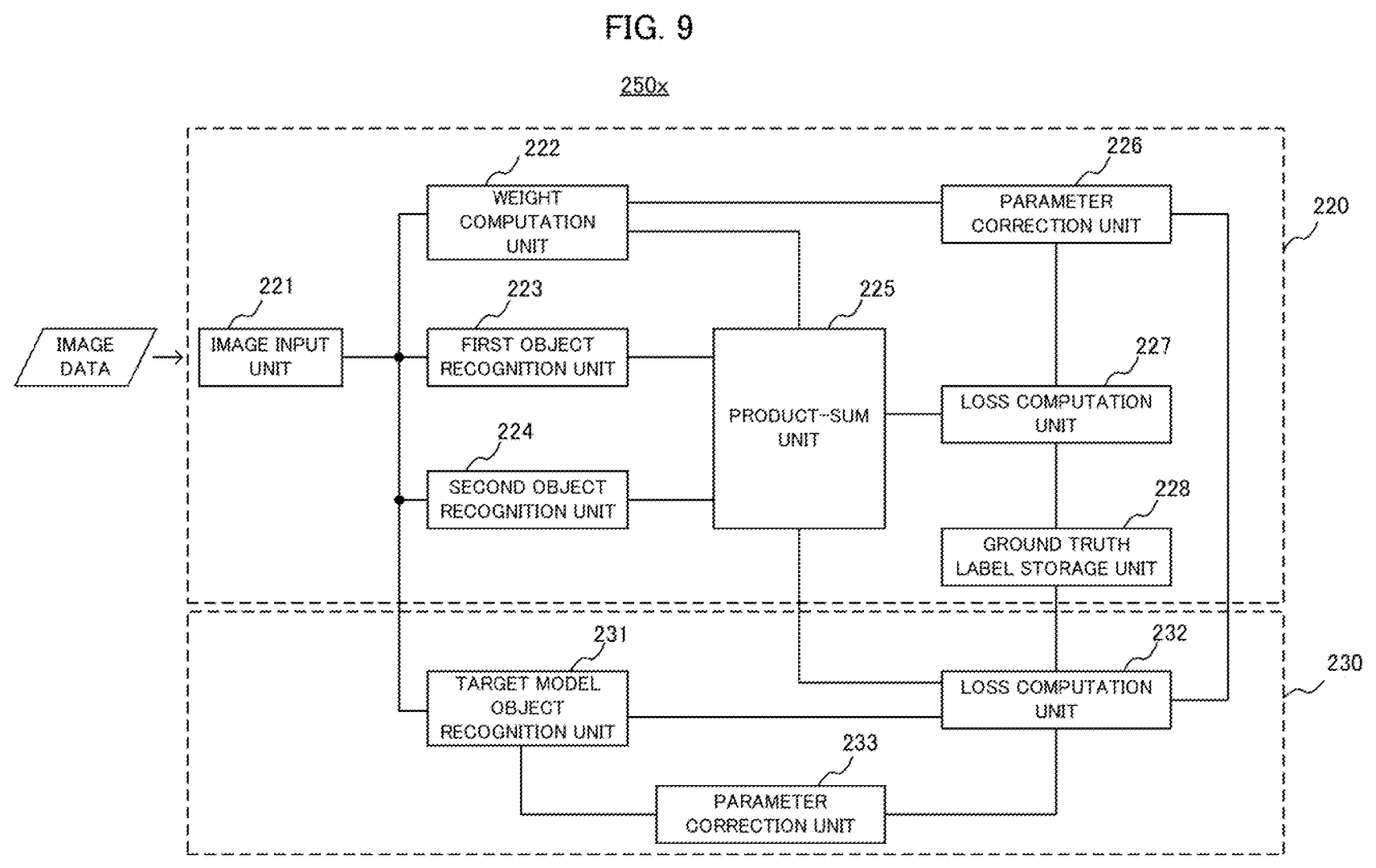

FIG. 9 is a block diagram illustrating a functional configuration of the model update unit 250x according to the second example. As illustrated, in the model update unit 250x according to the second example, the output of the loss computation unit 232 is also supplied to the parameter correction unit 226. Except for this point, the model update unit 250x according to the second example is the same as the model update unit 250 of the first example shown in FIG. 6, and each element operates basically in the same manner as the first example.

In the second example, the loss computation unit 232 supplies the target model loss not only to the parameter correction unit 233, but also to the the parameter correction unit 26. The parameter correction unit 226 corrects the weight computation parameters of the weight computation unit 222 in consideration of the target model loss. Specifically, the parameter correction unit 226 corrects the weight computation parameters so that the large-scale model loss and the target model loss are reduced.

Figure 10:
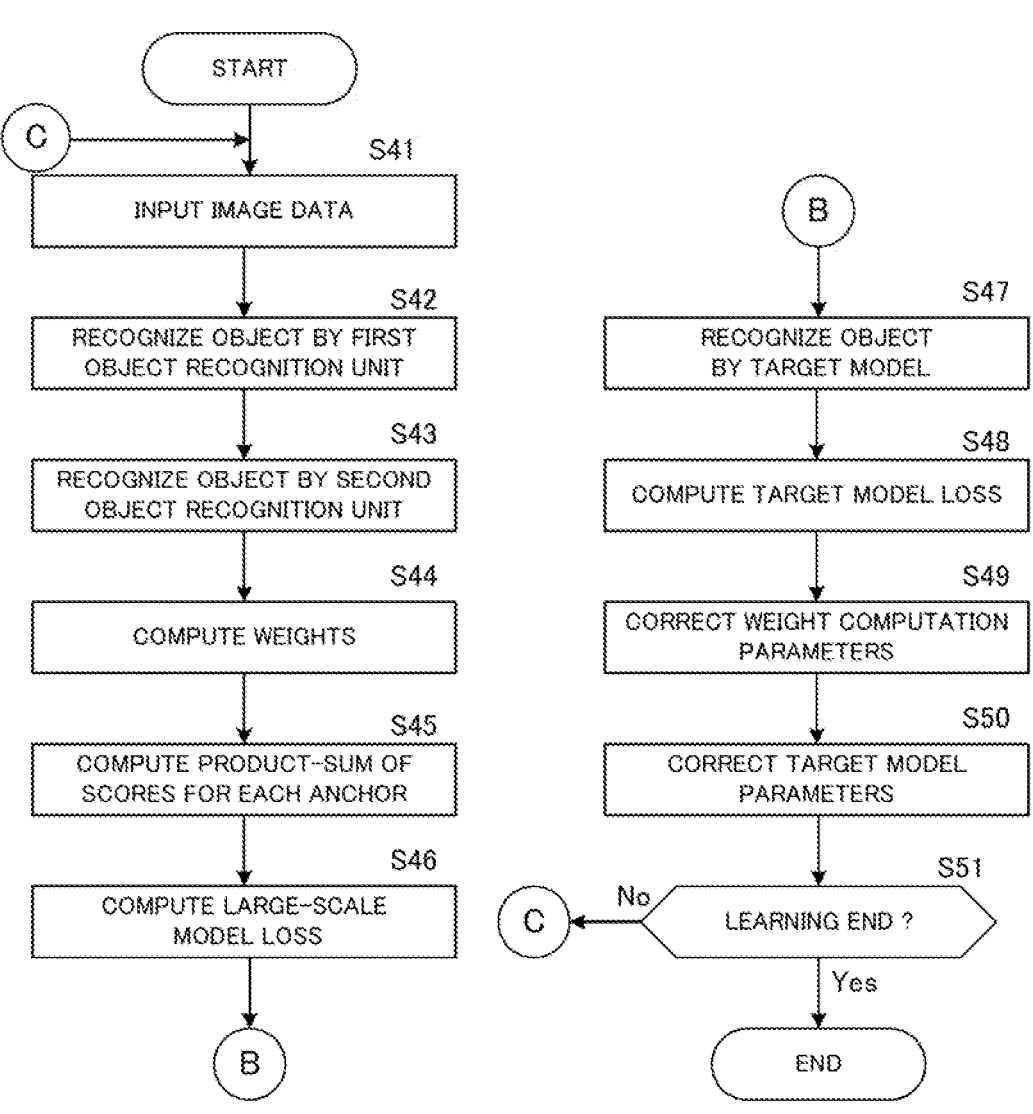
FIG. 10 is a flowchart of a model update processing according to a second example of the model update unit.

Next, the operation of the model update processing according to the second example will be described. FIG. 10 is a flowchart of model update processing performed according to the second example. In the model update processing illustrated in FIG. 10, steps S41 to S46 are the same as steps S11 to S16 of the model update processing illustrated in FIG. 8 performed by the model update unit 250 according to the first example, and thus description thereof is omitted.

When the loss computation unit 227 computes the large-scale model loss in step S46, the target model object recognition unit 231 performs object recognition using the inputted image data, and outputs the score information and the coordinate information of the recognition target object in the image for each anchor and for each recognition target object (step S47). Next, the loss computation unit 232 compares the score information and the coordinate information outputted by the target model object recognition unit 231 with the ground truth label and the score information and the coordinate information outputted by the large-scale model unit 20 to compute the target model loss, and supplies the target model loss to the parameter correction unit 226 and the parameter correction unit 233 (step S48).

The parameter correction unit 226 corrects the weight computation parameters of the weight computation unit 222 so that the large-scale model loss and the target model loss are reduced (step S49). Further, the parameter correction unit 233 corrects the parameters in the target model object recognition unit 231 so that the target model loss is reduced (step S50). The model update unit 250x repeats the above-described steps S41 to S50 while a predetermined condition condition holds true, and ends the processing.

As described above, according to the second example of the model update unit, the learning step of the large-scale model and the learning step of the target model can be executed simultaneously. Therefore, it becomes possible to efficiently construct a target model suitable for the environment of the new site.

Third Example

Next, a third example of the model update unit 250 will be described. The third example performs weighting for each object recognition unit using the shooting environment information of the image data.

FIG. 11 is a block diagram showing a functional configuration of the model update unit 250y according to the third example. As shown, the model update unit 250y includes a weight computation/environment prediction unit 222y instead of the weight computation unit 222 in the model update unit 250 shown in FIG. 6, and further includes a prediction loss computation unit 229. Except for this, the model update unit 250y of the third example is the same as the model update unit 250 of the first example.

To the prediction loss computation unit 229, the shooting environment information is inputted. The shooting environment information is information indicating the environment in which the image data for learning is captured, i.e., the environment in which the update-target edge device 100 is located. For example, the shooting environment information is information such as: (a) an indication of the installation location (indoors or outdoors) of the camera used to acquire the image data, (b) the weather at the time (sunny, cloudy, rainy, or snowy), (c) the time (daytime or nighttime), and (d) the tilt angle of the camera (0-30 degrees, 30-60 degrees, or 60-90 degrees).

The weight computation/environment prediction unit $222y$ computes the weights for the first object recognition unit 223 and the second object recognition unit 224 using the weight computation parameters. At the same time, the weight computation/environment prediction unit $222y$ predicts the shooting environment of the input image data using parameters for predicting the shooting environment (hereinafter referred to as "shooting environment prediction parameters"), generates prediction environment information by predicting the shooting environment, and outputs the predicted environment information to the prediction loss computation unit 229. For example, if the four types of information (a) to (d) mentioned above are used as the shooting environment information, the weight computation/environment prediction unit $222y$ expresses an attribute value indicating the information of each type in one dimension, and outputs a four-dimensional value as the predicted environment information. The weight computation/environment prediction unit $222y$ uses some of the computations in common when computing the weights and the predicted environment information. For example, in the case of computation using a deep neural network, the weight computation/environment prediction unit $222y$ uses the lower layers of the network in common, and only the upper layers are specialized for computing the weights and the predicted environment information. In other words, the weight computation/environment prediction unit $222y$ performs what is called multi-task learning. With this arrangement, the weight computation parameters and the environment prediction parameters have a portion shared in common.

The prediction loss computation unit 229 computes a difference between the shooting environment information and the prediction environment computed by the weight computation/environment prediction unit $222y$, and outputs the difference as a prediction loss to the parameter correction unit 226. The parameter correction unit 226 corrects the parameters of the network existing in the weight computation/environment prediction unit $222y$ so as to reduce the loss computed by the loss computation unit 227 and the prediction loss computed by the prediction loss computation unit 229.

In the third example, in the weight computation/environment prediction unit $222y$, a part of the network is shared for the computation of the weight and the computation of the prediction environment information, so that models of similar shooting environments tend to have similar weights. As a result, an effect of stabilizing the learning in the weight computation/environment prediction unit $222y$ can be obtained.

Second Example Embodiment

Figure 12:
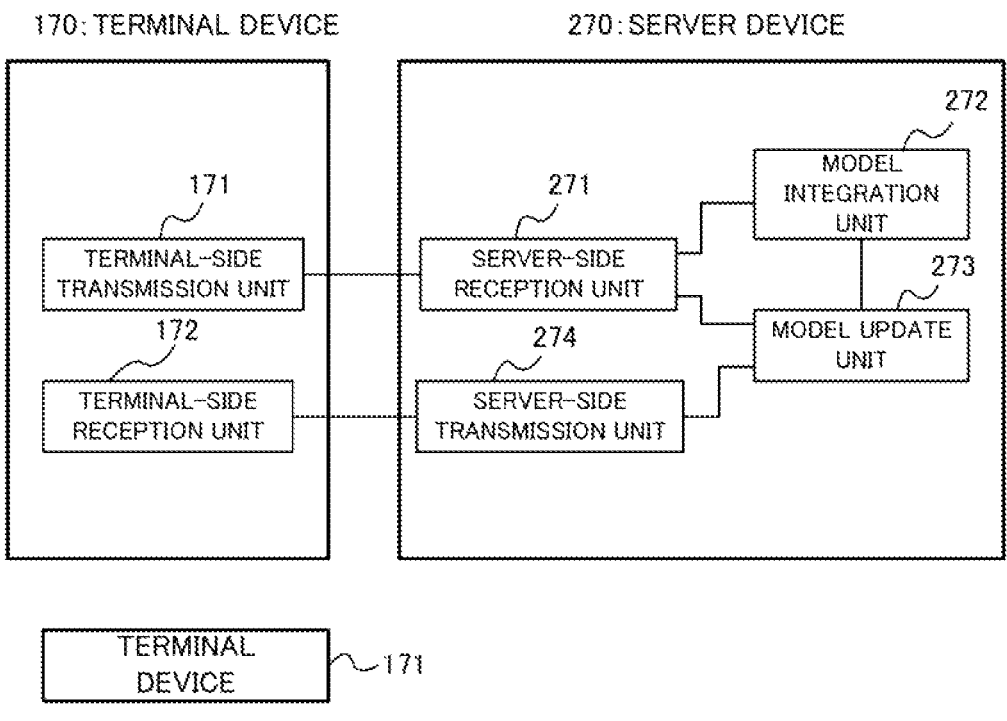
FIG. 12 is a block diagram showing a configuration of an object recognition system according to a second example embodiment.

FIG. 12 is a block diagram illustrating a configuration of an object recognition system according to a second example embodiment. The object recognition system of the second example embodiment includes a plurality of terminal devices 170 and a server device 270. The terminal device 170 includes a terminal-side transmission unit 171, and a terminal-side reception unit 172. Further, the server device 270 includes a server-side reception unit 271, a model integration unit 272, a model update unit 273, and a server-side transmission unit 274.

The terminal-side transmission unit 171 transmits model information defining a model to be used for the recognition processing to the server device 270. The server-side reception unit 271 receives the model information from the plurality of terminal devices 170. The model integration unit 272 integrates the model information received from the plurality of terminal devices 170 to generate an integrated model. The model update unit 273 updates the model represented by the model information received from the terminal device 170 of update-target by learning using the integrated model to generate the updated model. The server-side transmission unit 274 transmits model information representing the updated model to the terminal device 170 of update-target. The terminal-side reception unit 172 receives the model information that represents the updated model generated by the server device 270.

A part or all of the example embodiments described above may also be described as the following supplementary notes, but not limited thereto.

Supplementary Note 1

A recognition system comprising a plurality of terminal devices and a server device,
  wherein the terminal device includes:
  a terminal-side transmission unit configured to transmit a model information defining a model used in a recognition processing to the server device; and
  a terminal-side reception unit configured to receive the model information defining an updated model generated by the server device, and
  wherein the server device includes:
  a server-side reception unit configured to receive the model information from the plurality of terminal devices;
  a model integration unit configured to generate an integrated model by integrating the model information received from the plurality of terminal devices;
  a model update unit configured to generate the updated model by learning a model defined by the model information received from the terminal device of update-target using the integrated model; and
  a server-side transmission unit configured to transmit the model information of the updated model to the terminal device of update-target.

Supplementary Note 2

The recognition system according to Supplementary note 1, wherein the model integration unit computes a weighted sum of recognition results by the models defined by the model information received from the plurality of terminal devices to generate the integrated model.

Supplementary Note 3

The recognition system according to Supplementary note 1 or 2,
  wherein the model information includes a model structure representing a structure of the model, and a set of parameters set to the model structure, and
  wherein the model update unit updates the set of parameters included in the model information received from the terminal device of update-target.

Supplementary Note 4

The recognition system according to any one of Supplementary notes 1 to 3, wherein the terminal-side transmission unit of the target terminal device of update-target transmits image data acquired at a site where the terminal device of update-target is placed to the server device, wherein the server-side reception unit receives the image data, wherein the model integration unit generates the integrated model using the image data, and wherein the model update unit updates the model using the image data.

Supplementary Note 5

The recognition system according to Supplementary note 4, wherein the server device deletes the image data after the model update unit updates the model.

Supplementary Note 6

The recognition system according to Supplementary note 4 or 5, wherein the terminal-side transmission unit transmits shooting environment information of the image data to the server device, and wherein the model integration unit also uses the shooting environment information to generate the integrated model.

Supplementary Note 7

The recognition system according to any one of Supplementary notes 1 to 6, wherein the terminal device includes a learning unit configured to learn the model using the image data acquired at a site where the terminal device is placed, and wherein the terminal-side transmission unit transmits the model information corresponding to a learned model to the server device every time learning by the learning unit ends.

Supplementary Note 8

The recognition system according to any one of Supplementary notes 1 to 7, wherein the terminal device includes a recognition result presentation unit configured to present a recognition result by the model before updating by the server device and the updated model updated by the server device.

Supplementary Note 9

The recognition system according to any one of Supplementary notes 1 to 8, wherein the terminal-side transmission unit transmits a code system information indicating a correspondence between a recognition object by the model and a class code of the recognition object to the server device, and wherein the model integration unit unifies the class codes by the models in a plurality of terminal devices based on the code system information to generate the integrated model.

Supplementary Note 10

The recognition system according to any one of Supplementary notes 1 to 8, wherein the terminal-side transmission unit transmits the model information in which a class code is applied to each recognition object according to a standard code system to the server device, and wherein the standard code system is a code system that indicates a correspondence between a recognition object by the model and a class code of the recognition object, and wherein the standard code system is used by the plurality of terminal devices and the server device in a unified manner.

Supplementary Note 11

A model processing device capable of communicating with a plurality of terminal devices, comprising:

a reception unit configured to receive a model information from a plurality of terminal devices;

a model integration unit configured to generate an integrated model by integrating the model information received from the plurality of terminal devices;

a model update unit configured to generate an updated model by learning a model defined by the model information received from the terminal device of update-target using the integrated model; and a transmission unit configured to transmit the model information of the updated model to the terminal device of update-target.

Supplementary Note 12

A model processing method comprising:

receiving a model information from a plurality of terminal devices;

generating an integrated model by integrating the model information received from the plurality of terminal devices;

generating an updated model by learning a model defined by the model information received from the terminal device of update-target using the integrated model; and transmitting the model information of the updated model to the terminal device of update-target.

Supplementary Note 13

A recording medium storing a program that causes a computer to execute a processing of:

receiving a model information from a plurality of terminal devices;

generating an integrated model by integrating the model information received from the plurality of terminal devices;

generating an updated model by learning a model defined by the model information received from the terminal device of update-target using the integrated model; and transmitting the model information of the updated model to the terminal device of update-target.

While the present invention has been described with reference to the example embodiments and examples, the present invention is not limited to the above example embodiments and examples. Various changes which can be understood by those skilled in the art within the scope of the present invention can be made in the configuration and details of the present invention.

DESCRIPTION OF SYMBOLS

1 Object recognition system
100 Edge device

103 Processor
111 Recognition unit
112 Model storage unit
113 Model learning unit
114 Model information reception unit
115 Model Information transmission unit
116 Recognition result presentation unit
170 Terminal device
200, 270 Server device
211 Model Information transmission unit
212 Model information reception unit
213 Model accumulation unit
214 Temporary image data
250 Model update unit

What is claimed is:

1. A recognition system comprising:
a plurality of terminal devices; and
a server device,
    wherein at least one of the plurality of terminal devices includes:
        a terminal-side transmitter configured to transmit a model information defining a model used in a recognition processing to the server device; and
        a terminal-side receiver configured to receive the model information defining an updated model generated by the server device, and
    wherein the server device includes:
        a server-side receiver configured to receive the model information from the plurality of terminal devices;
        at least one processor configured to execute:
            a model integrator configured to generate an integrated model by integrating the model information received from the plurality of terminal devices; and
            a model updater configured to generate an updated target model by learning a target model defined by the model information received from a target terminal device using the integrated model; and
        a server-side transmitter configured to transmit the model information of the updated target model to the target terminal device,
    wherein the model integrator is configured to compute a weighted sum of recognition results by the models defined by the model information received from the plurality of terminal devices to generate an integrated recognition result, and
    wherein the model updater is configured to update the target model based on a loss between the integrated recognition result and a recognition result by the target model.

2. The recognition system according to claim 1, wherein the model information includes a model structure representing a structure of the model, and a set of parameters set to the model structure, and
    wherein the model updater is configured to update the set of parameters included in the model information received from the target terminal device.

3. The recognition system according to claim 1, wherein the terminal-side transmitter of the target terminal device is configured to transmit image data acquired at a site where the target terminal device is placed to the server device,
    wherein the server-side receiver is configured to receive the image data,
    wherein the model integrator is configured to generate the integrated model using the image data, and wherein the model updater is configured to update the model using the image data.

4. The recognition system according to claim 3, wherein the server device is configured to delete the image data after the model updater updates the model.

5. The recognition system according to claim 3, wherein the terminal-side transmitter is configured to transmit shooting environment information of the image data to the server device, and
    wherein the model integrator is configured to also use the shooting environment information to generate the integrated model.

6. The recognition system according to claim 1, wherein the at least one of the plurality of terminal devices is configured to learn the model using image data acquired at a site where the at least one of the plurality of terminal devices is placed, and
    wherein the terminal-side transmitter is configured to transmit the model information corresponding to a learned model to the server device every time learning ends.

7. The recognition system according to claim 1, wherein at least one of the plurality of terminal devices is configured to present a recognition result by the model before updating by the server device and the updated model updated by the server device.

8. The recognition system according to claim 1, wherein the terminal-side transmitter is configured to transmit a code system information indicating a correspondence between a recognition object by the model and a class code of the recognition object to the server device, and
    wherein the model integrator is configured to unify the class codes by the models in the plurality of terminal devices based on the code system information to generate the integrated model.

9. The recognition system according to claim 1, wherein the terminal-side transmitter is configured to transmit the model information in which a class code is applied to each of a plurality of recognition objects according to a standard code system to the server device, and
    wherein the standard code system is a code system that indicates a correspondence between a recognition object by the model and a class code of the recognition object, and
    wherein the standard code system is used by the plurality of terminal devices and the server device in a unified manner.

10. A model processing device capable of communicating with a plurality of terminal devices, the model processing device comprising:
    a memory storing instructions; and
    one or more processors configured to execute the instructions to:
    receive a model information from the plurality of terminal devices;
    generate an integrated model by integrating the model information received from the plurality of terminal devices;
    generate an updated target model by learning a target model defined by the model information received from a target terminal device using the integrated model; and
    transmit the model information of the updated target model to the target terminal device,
    wherein the one or more processors compute a weighted sum of recognition results by the models defined by the model information received from the plurality of terminal devices to generate an integrated recognition result, and wherein the one or more processors updates the target model based on a loss between the integrated recognition result and a recognition result by the target model.

11. A model processing method comprising:

receiving a model information from a plurality of terminal devices;

generating an integrated model by integrating the model information received from the plurality of terminal devices;

generating an updated target model by learning a target model defined by the model information received from a target terminal device using the integrated model; and transmitting the model information of the updated model to the target terminal device, wherein a weighted sum of recognition results by the models defined by the model information received from the plurality of terminal devices are computed to generate an integrated recognition result, and wherein the target model is updated based on a loss between the integrated recognition result and a recognition result by the target model.

12. A non-transitory computer-readable recording medium recording a program causing a computer to execute the model processing method according to claim 11.

* * * * *